United States Patent [19]
Borden

[11] Patent Number: 5,877,860
[45] Date of Patent: Mar. 2, 1999

[54] SYSTEM AND METHOD FOR MEASURING THE MICROROUGHNESS OF A SURFACE OF A SUBSTRATE

[75] Inventor: Peter G. Borden, San Mateo, Calif.

[73] Assignee: Boxer Cross, Inc., Menlo Park, Calif.

[21] Appl. No.: 648,231

[22] Filed: May 13, 1996

[51] Int. Cl.⁶ .................................................. G01B 11/24
[52] U.S. Cl. .......................................................... 356/376
[58] Field of Search ............................. 356/376, 72, 73, 356/335–343, 345, 349, 351, 353, 360, 361, 369, 375, 394; 250/560, 561, 574, 205, 211

[56] References Cited

U.S. PATENT DOCUMENTS

| | | | |
|---|---|---|---|
| 4,498,773 | 2/1985 | von Bieren | 356/360 |
| 4,650,330 | 3/1987 | Fujita | 356/349 |
| 4,677,302 | 6/1987 | Chiu et al. | 250/560 |
| 5,037,202 | 8/1991 | Batchelder et al. | 356/336 |
| 5,061,070 | 10/1991 | Batchelder et al. | 356/345 |
| 5,133,602 | 7/1992 | Batchelder et al. | 356/375 |
| 5,351,126 | 9/1994 | Takada et al. | 356/376 |
| 5,355,221 | 10/1994 | Cohen et al. | 356/359 |
| 5,473,393 | 12/1995 | Manabe | 353/38 |
| 5,548,404 | 8/1996 | Kupershmidt et al. | 356/368 |

OTHER PUBLICATIONS

W. Murray Bullis, SEMI (Jan., 1996) "Characterizing microroughness and haze on silicon wafers"– pp. 47–53.

*Primary Examiner*—Frank G. Font
*Assistant Examiner*—Michael P. Stafira
*Attorney, Agent, or Firm*—Gray Cary Ware & Freidenrich

[57] ABSTRACT

A system for measuring an amount of microroughness of a surface of a substrate, wherein a first beam of electromagnetic radiation and a second beam of electromagnetic radiation are generated, the first and second beams being substantially parallel and spaced apart from each other so that the first and second beams are substantially non-overlapping, and the first and second beams are focused onto the substrate so that the beams impinge upon a selected area of the surface of the substrate having a surface contour, the surface contour of the substrate causing a scattering of both beams. The scattering of the first and second beams is detected, the amount of scattering corresponding to a microroughness value of the selected area of the substrate, and the microroughness value of the selected area of the substrate is determined from the amount of scattering of the first and second beams. The microroughness measuring system may also be used for controlling a fabrication process.

40 Claims, 12 Drawing Sheets

SYSTEM AND METHOD FOR MEASURING THE MICROROUGHNESS OF A SURFACE OF A SUBSTRATE

BACKGROUND OF THE INVENTION

This invention relates generally to a system and method for measuring the roughness of a surface of a substrate, and in particular, to a system and method for measuring the microroughness of a surface of a substrate.

Various types of substrates are used today that require a flat surface. For example, a flat semiconductor substrate is needed to fabricate electrical devices on the substrate so that the devices have the desired properties. A disk drive media substrate also needs to have a flat surface so that data may be magnetically or optically encoded onto the surface of the substrate. Similarly, substrates for liquid crystal flat panel displays also require flat surfaces. As smaller devices are formed on the semiconductor substrate and as more data is encoded on the disc drive media substrate, the surfaces of the respective substrates must have less roughness overall, and the average size of the roughness must be reduced.

For example, as the size of the active devices, such as transistors formed on a semiconductor substrate is reduced, it is necessary to use correspondingly thinner gate dielectrics to separate the substrate from the gate electrode and achieve the desired performance of the transistor. For current 0.18 $\mu$m transistor design rules, the gate dielectric must be only 50 angstroms thick. As a comparison, a single strand of human hair is 20,000 times wider than this gate dielectric. However, even through the thickness of these gate dielectric must be reduced, the breakdown voltage strength of these gate dielectrics must be maintained. For a gate voltage of only 2 volts, the gate dielectric must be able to withstand an electric field in excess of 4 megavolts/cm.

To meet these design requirements, it is necessary to minimize the roughness of the semiconductor substrate, especially at the interface between the gate dielectric and the substrate. The roughness at the interface between the gate dielectric and the substrate is known as microroughness because the size of the roughness is on the order of only 1 angstrom. The microroughness is usually characterized by an average size of all of the microroughness particles, known as an RMS value, and a number of microroughness particles that have a particular microroughness size, known as the size density. For a gate dielectric that is 50 angstroms thick, any roughness that is on the order of a few angstroms is not acceptable and must be removed, or the device may not meet its desired performance.

Thus, there is a need for measuring systems that effectively measure and control the microroughness of the surface of the substrate. There are two conventional methods for measuring microroughness. One is an atomic force microscopy (AFM) method in which a microscope moves an atom-sized measuring probe along the surface of the substrate, and the microroughness of the substrate is determined. This method is slow, and requires contact with the surface of the substrate, which is undesirable. Due to these limitations with this method, atomic force microscopy is not well suited for measuring the microroughness of substrates in real time in order to control a fabrication process.

Reflectance scatterometry is another conventional method that involves using a light source to reflect light off of the surface of the substrate, and measuring the scattering that occurs to the light due to the microroughness. From the scattering of the light, the microroughness may be determined. This method does not contact the surface of the substrate and is faster than atomic force microscopy, but requires a large portion of the substrate surface for testing. For real-time control of a fabrication process, only a small area of the substrate is available for testing since the gate dielectric, for example, may be only 0.5 micrometers long. In addition, this method does not have the range of sensitivity necessary to measure microroughness down to the angstrom size roughness level, which is needed for current fabrication processes.

Thus, there is a need for a system and method for real time monitoring and measurement of the microroughness of a surface of a substrate to control a fabrication process which avoid these and other problems of known devices, and it is to this end that the present invention is directed.

SUMMARY OF THE INVENTION

The invention addresses the foregoing and other problems attendant to known systems and methods by providing a microroughness measuring system and method which measures microroughness down to 1 angstrom quickly, without contacting the surface, and may be used in real time as part of a fabrication process so that real time, tight control may be exerted on the fabrication process. The invention provides a size spectrum of the microroughness on the surface of the substrate. The microroughness measuring system and method also require very little space (about 2 square microns) on the substrate and measure the microroughness of partially completed devices on a substrate.

The microroughness measuring system and method also monitor and measure the microroughness of surfaces of a semiconductor substrate in a fabrication process in order to control the fabrication process in real time. Thus, a surface of the substrate whose microroughness is too large may be rapidly identified and the fabrication process may be changed in real time to provide tight control of the fabrication process. The microroughness measuring system also monitors and measures the microroughness of disk drive media substrates, and liquid crystal flat panel display substrates in order to control the fabrication process for these substrates in real time.

In accordance with the invention, a system for measuring an amount of microroughness on a surface of a substrate is provided, wherein a first beam of electromagnetic radiation and a second beam of electromagnetic radiation are generated, the first and second beams being substantially parallel and spaced apart from each other so that the first and second beams are substantially non-overlapping. The first and second beams are focused onto the substrate so that the beams impinge upon a selected area of the surface of the substrate having a surface contour, the surface contour of the substrate causing a scattering of both beams. The scattering of the first and second beams is detected, the amount of scattering corresponding to a microroughness value of the selected area of the substrate, and the microroughness value of the selected area of the substrate is determined from the amount of scattering of the first and second beams. The microroughness measuring system may also be used for controlling a plurality of process steps in a fabrication process.

DETAILED DESCRIPTION OF THE PREFERRED EMBODIMENTS

The invention is particularly applicable to measuring the microroughness of a surface of a semiconductor substrate to provide tight control of a fabrication process. It is in this context that the invention will be described. It will be appreciated, however, that the system and method in accordance with the invention has greater utility.

To understand the invention, it is necessary to understand the physical parameters and the operation of a device formed on a semiconductor substrate. In particular, the parameters and operation of an n-channel field effect transistor (FET) will be described with reference to FIG. 1. However, the system and method in accordance with the invention may also be used to measure the microroughness of other types of substrates, such as disc drive media substrates and liquid crystal flat panel display substrates.

Figure 1:
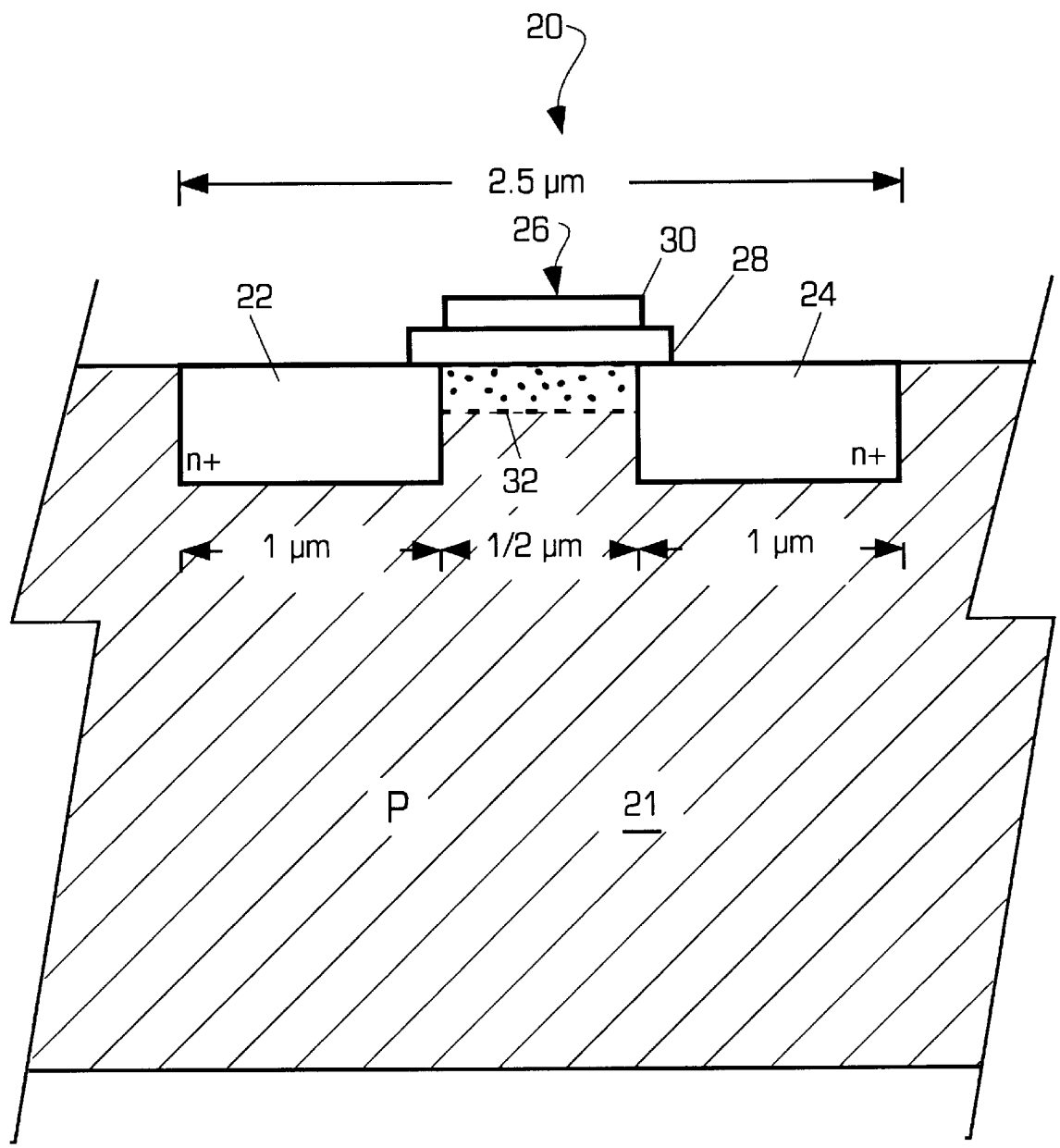
FIG. 1 is a diagram of an n-channel field effect transistor.

FIG. 1 is a diagram of an n-channel field effect transistor (FET) 20 formed in a semiconductor substrate 21 which may be silicon, but may also be gallium arsenide, indium phosphide, or any other type of substrate used for forming semiconductor devices. In this example, the substrate is a P-type substrate. A P-type substrate has positively charged majority carriers (holes), such as atoms with missing electrons, that carry current. Similarly, electrons, known as minority carriers, also carry current. The FET 20 includes a pair of regions 22, 24 that have been doped (i.e., changed atoms have been added) so that their regions now have more negative charge carriers than the substrate. The doping of these regions is well known and will not be described here in detail. In an FET, the first region 22 is known as a source, and the second region 24 is known as a drain. The FET 20 also has a region 26, known as a gate. The gate 26 has an insulating layer 28, that may be silicon dioxide, and a gate electrode 30, that may be made from a polysilicon material. As shown, the FET 20 is 2.5 micrometers (microns) wide, the source and drain are 1 micron wide each, and the gate is 0.5 microns wide. The operation of the FET shown will now be briefly described.

The FET is basically an electrical switch that may be turned on or off by the application of a voltage to the gate. In particular, the application of a positive voltage, for this particular n-channel FET, to the gate electrode 30 attracts electrons to the surface of the substrate in a region 32 between the source 22 and the drain 24. This region is known as a channel. Since the substrate is P-type (i.e., has more positive carriers than negative carriers), the electrons attracted to the channel are minority carriers. The gate insulating layer 28 prevents the electrons in the channel from flowing to the gate electrode 30. Once sufficient positive voltage has been applied to the gate electrode 30, the electrons in the channel form a conducting inversion layer that permits current to flow from the source region 22, through the channel 32 and out the drain region 24. In this state, the FET is turned on. Without sufficient positive voltage applied to the gate, the FET is in an off state and current does not flow from the source to the drain. The gate voltage may be varied to increase or decrease the amount of current that flows from the source region to the drain region.

One of the critical properties of a transistor is the ability of the gate insulating layer (gate dielectric) to withstand electric fields on the order of 4 megavolts/cm. This property is attainable only if the roughness under the gate insulating layer is minimized. For 0.18 $\mu$m transistor design rules, the gate insulating layer must be only 50 angstroms thick. For these design rules, the roughness of the substrate underneath the gate insulating layer, known as microroughness, needs to be measured down to about 1 angstrom since any roughness that is significantly larger than 1 angstrom must be removed. As described above, 1 angstrom is 100,000 times smaller than the width of a strand of human hair. The microroughness measuring system in accordance with the invention accurately and quickly measures these microroughness so that tight control may be maintained over a semiconductor fabrication process. Similarly, the microroughness measuring system may also be used to tightly control a disk drive media fabrication process or a flat panel display fabrication process. The system for measuring the microroughness will now be described.

Figure 2:
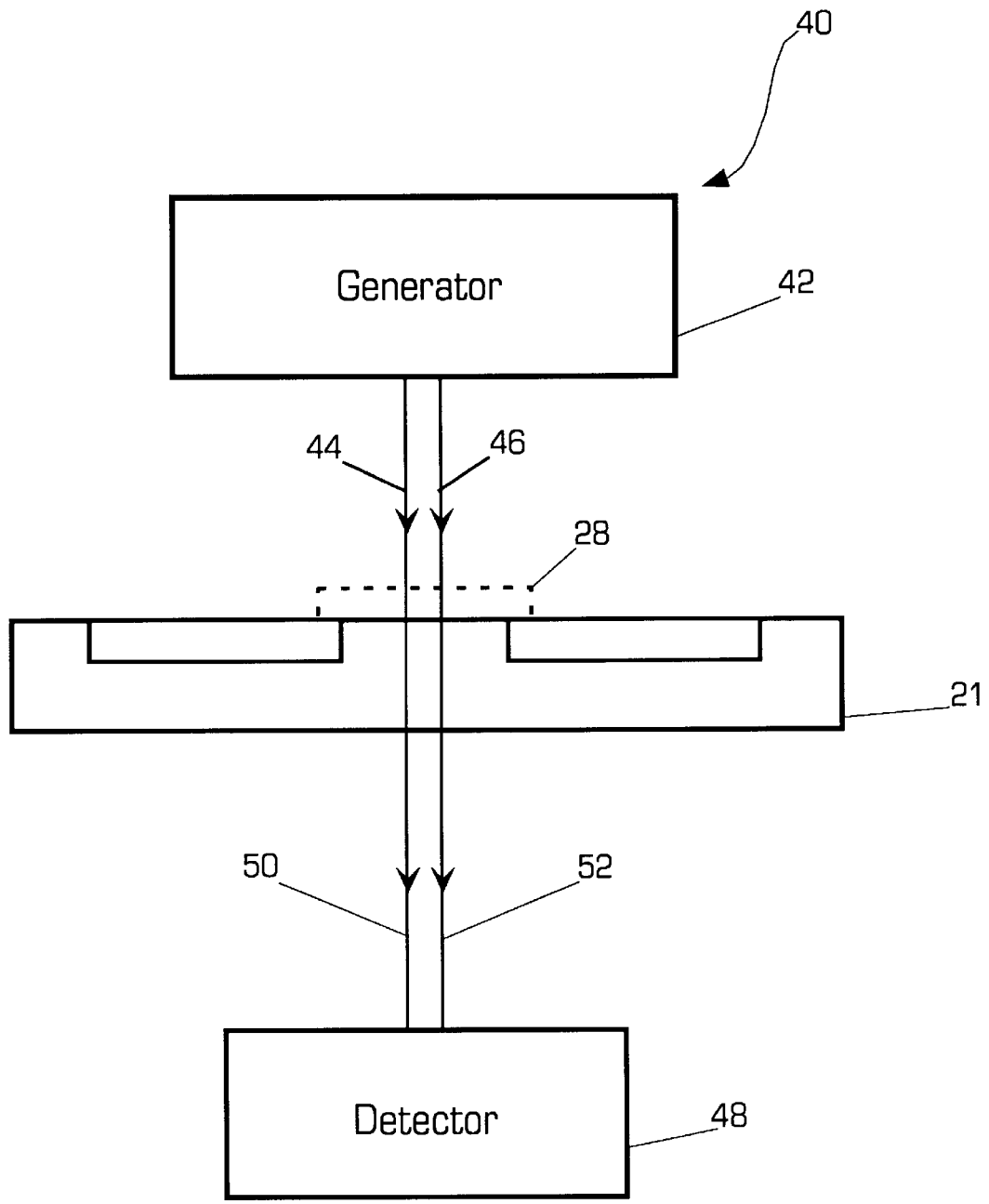
FIG. 2 is a block diagram of a transmissive type first embodiment of a microroughness measuring system in accordance with the invention.

FIG. 2 is a block diagram of a transmissive type first embodiment of the microroughness measuring system 40 in accordance with the invention. The transmissive microroughness measuring system is shown being used to measure the microroughness of the surface of the substrate 21 underneath the gate insulating layer 28. The transmissive type microroughness measuring system may include a generator 42, and a detector 48. The generator 42 generates a first beam 44 of electromagnetic radiation having a first polarization, and a second beam 46 of electromagnetic radiation having a second polarization. The first and second beams may be polarized relative to each other in any fashion, but preferably are circularly polarized so that the polarizations are 90° different and there is a 90° phase difference between the beams. The first and second beams are also substantially parallel, since a small divergence angle exists between the beams, as described below. The first and second beams may have a wavelength of greater than 1100 nanometers, and may preferably have a wavelength of 1300 nanometers, for a silicon substrate. This range of wavelengths is selected for silicon because it is above the band gap for silicon so that the beams mostly pass through the silicon substrate and affords a transmissive system. This range of wavelengths corresponds to a photon energy that is less than the band gap energy of the substrate. For a different type of substrate, such as a disk drive media substrate or a flat panel display substrate, a different range of wavelengths and a corresponding different range of photon energies may be selected so that the wavelengths are above the band gap of the particular substrate.

The first beam 44 and the second beam 46 generated by the generator 42 are focused onto the surface of the substrate. For this transmissive system, the beams impinge upon a selected area on the surface of the substrate, and some of the energy of the beams is scattered by a surface contour of the substrate that includes many microroughness particles, as described below. The microroughness of the selected area of the substrate surface impinged by the first beam scatters that first beam in all directions, and the second beam is used as a reference beam. Similarly, the microroughness on the area of the substrate surface impinged by the second beam scatters the second beam in all directions, and the first beam acts as a reference beam. The first and second beams may be used as reference beams for each other because the energy scattered by the microroughness is small as compared to the total energy of each beam. As shown, some of the scattered electromagnetic radiation from each beam is scattered downwards in the same direction as the first and second beams 44, 46. Thus, a scattered first beam 50 is the superposition of the first beam 44 and any scattered energy from the surface of the substrate. Similarly, a scattered second beam 52 is the superposition of the second beam 46 and any scattered energy from the surface of the substrate. These two beams 50, 52 are received by the detector 48 that may measure the combined scattered energy from both beams as a function of the varying power of the beams or the varying frequency or wavelength of the beams as described below, and may determine the density of the microroughness particles for each different size of microroughness. The detector may also include a processor (not shown) for determining the number of microroughness particles for each size of microroughness.

Figure 3:
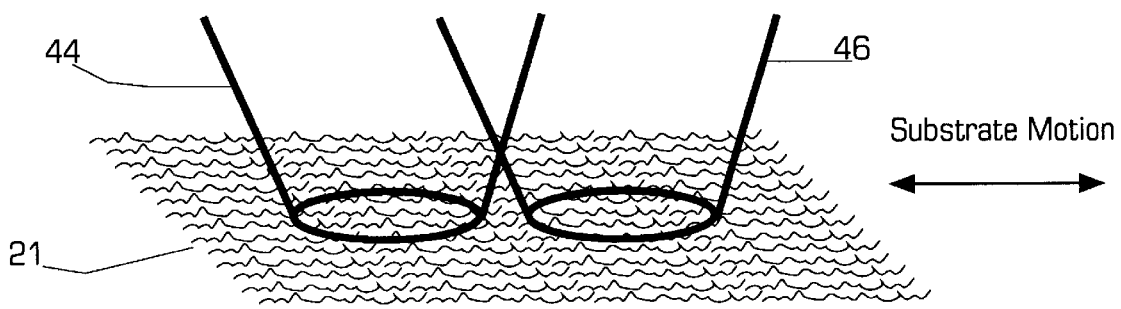
FIG. 3 is a diagram showing a first beam and a second beam of a microroughness measuring system, in accordance with the invention, impinging on the surface of a substrate.

FIG. 3 is a more detailed diagram of the surface of the substrate 21 showing the first beam 44, and the second beam 46. As shown, each beam is spaced apart from the other beam so that they are substantially non-overlapping. The beams are shown non-overlapping, but some overlap of the beams may occur without degrading the accuracy or quickness of the system. The beams, as shown, may preferably be about 1 $\mu$m apart. Due to this close spacing, the microroughness measuring system does not use much area of the substrate surface for testing so that the microroughness of surfaces of the substrate may be measured for small areas, such as underneath the gate insulating layer. In order to generate an average microroughness value for an entire region of the substrate, the substrate may be moved so that the region of the substrate is scanned by the beams. The scanning of the beams over the substrate will be described below in more detail. Now, a reflective type second embodiment of the microroughness measuring system will be described.

Figure 4:
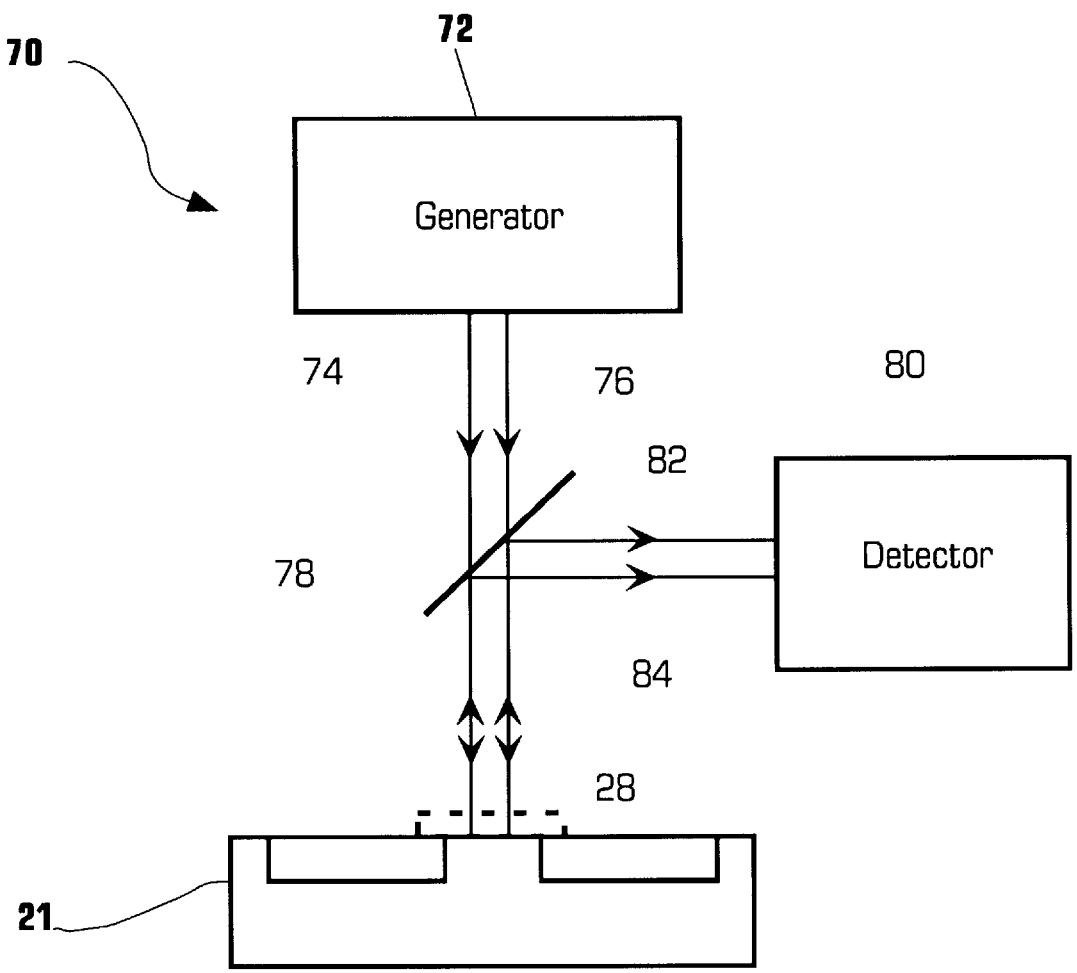
FIG. 4 is a block diagram of a reflective type second embodiment of the microroughness measuring system in accordance with the invention.

FIG. 4 is a block diagram of a reflective type second embodiment of the microroughness measuring system 70 that also measures the microroughness of a substrate surface quickly and accurately. The reflective type microroughness measuring system may include a generator 72 that generates a first beam of electromagnetic energy 74 having a first polarization, and a second beam of electromagnetic energy 76 with a second polarization, and a detector 80. The generator operates in the same manner as the generator 42, shown in FIG. 2. However, the generator 72 generates beams of electromagnetic radiation having different wavelengths than the prior generator. In particular, since the beams in this embodiment reflect off of the surface of the substrate, the wavelengths are selected to be below the band gap of the substrate. For example, for a silicon substrate, the wavelength may be less than 1100 nanometers, and may preferably be about 530 nanometers. This range of wavelengths correspond to a photon energy that is greater than the band gap energy of the substrate. As above, each type of substrate has a different band gap so different ranges of wavelengths and corresponding photon energies may be selected. These beams are also substantially parallel, as described above. After the beams are generated, they impinge upon a selected area of the surface of the substrate, and the microroughness of the substrate causes scattering of both beams. As described above, the beams scatter is all directions, including back towards the generator. In addition, the main beams also reflect back off of the surface and a combined first beam 82 is reflected off of a mirror 78 onto the detector. A combined second beam 84 also reflects off of the mirror onto the detector. The combined beams, as described above, are a superposition of the main beam generated by the generator, and the scattered energy caused by the microroughness of the surface of the substrate under each beam. As above, each beam acts as a reference for the other beam. The detector 80 operates in the same manner as the detector shown in FIG. 2, and will not be described here. Now, a semiconductor fabrication line with the microroughness measuring system will be described.

Figure 5:
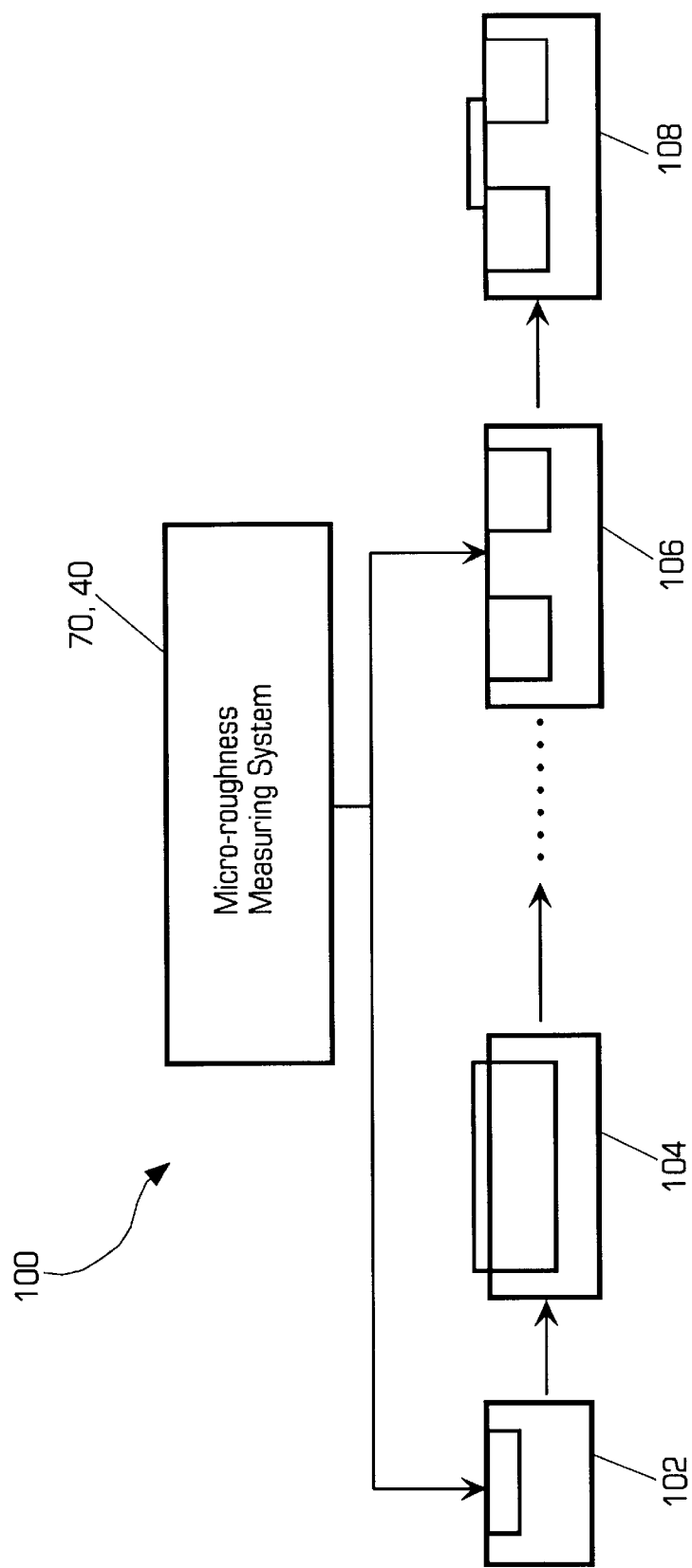
FIG. 5 is a diagrammatic view of a semiconductor fabrication line that includes the microroughness measuring system.

FIG. 5 is a diagram of a semiconductor fabrication line 100 that may have either the transmissive or reflective microroughness measuring system 40,70 incorporated therein. The figure shows only a partial fabrication line for clarity, and only a few of the process stations for a semiconductor fabrication line, such as an N-well station 102, a N-well oxide station 104, a source and drain forming station 106, and a gate oxide station 108 are shown. The microroughness measuring system may be used to measure the microroughness of the surface of the substrate before forming an oxide on the N-well, and also to measure microroughness prior to forming the gate insulating layer, also known as a gate oxide.

TABLE 1

MICROROUGHNESS MEASUREMENTS IN A
0.25 $\mu$m FABRICATION PROCESS

| Process Step | Microroughness |
|---|---|
| N-well oxide | X |
| N-well Drive In | |
| P-well oxide & drive in | |
| Pad Oxide | |
| α-Si and Nitride | |
| Field Vt Implant | |
| Field Oxide | |
| N and p Vt Implant | |
| Gate Oxide | X |
| N and P LDD Implants | |
| S/D Oxide | |
| S/D Implants | |
| S/D Anneal | |
| Silicide Deposition | |
| Silicidation | |
| Deposition, Densify BPSG | |
| Form 5 layer metal | |

The measuring system, in accordance with the invention, as shown in Table 1 may be used to measure the microroughness of the surface of the substrate in real time, as described below, at a number of stages in the production of the transistor. Thus, it may be used to tightly control the fabrication process of the active or passive device on a semiconductor substrate. The microroughness of a substrate may be measured, and the fabrication process stopped and changed to correct the microroughness of the substrate.

Similarly, the microroughness measuring system of the invention may measure the microroughness of any type of fabrication process, such as disc drive media substrate fabrication and liquid crystal flat panel display substrates, and is not limited to any particular type of semiconductor device or any particular type of substrate.

Figure 6:
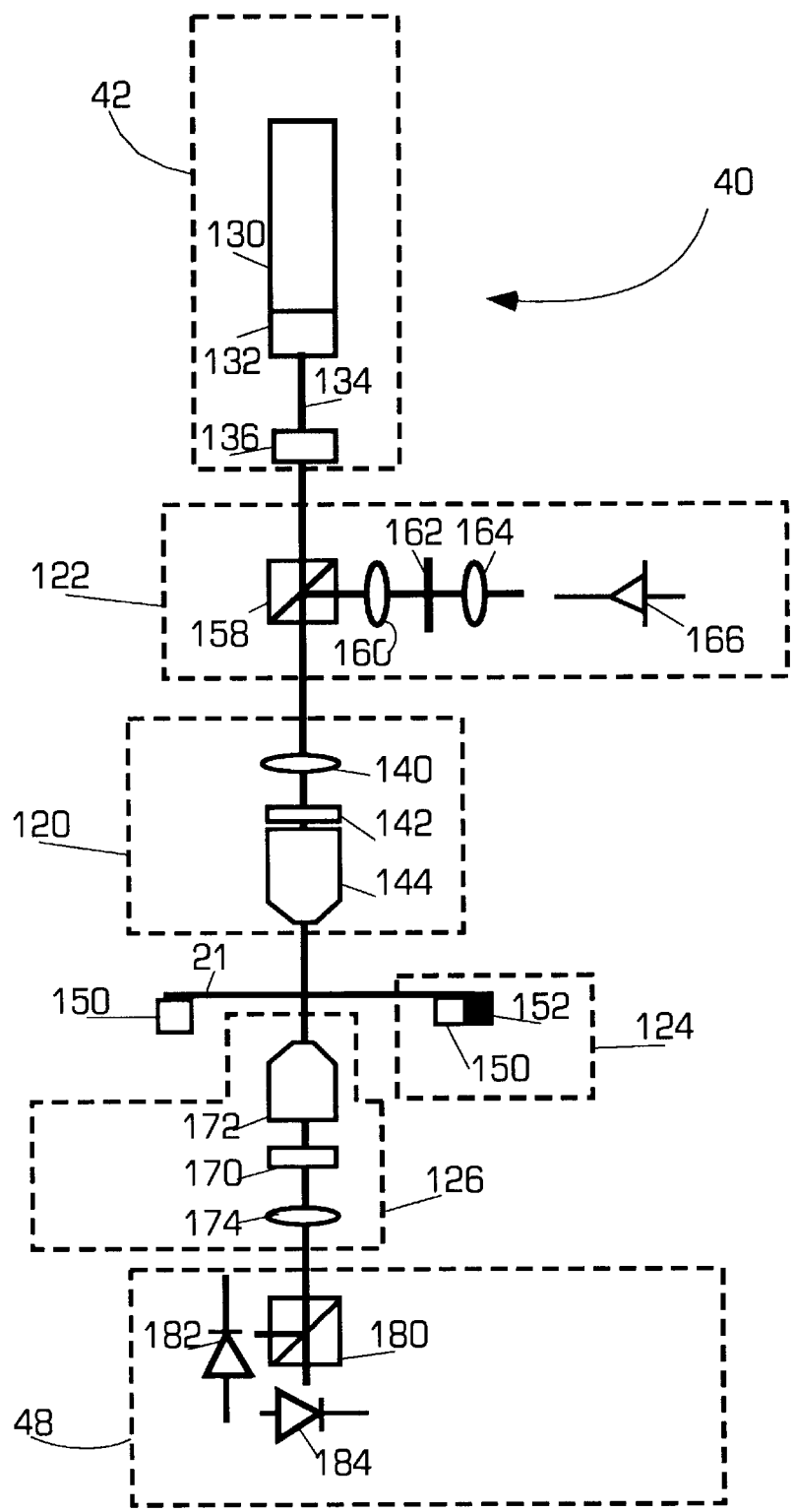
FIG. 6 more detailed block diagram of the transmissive type first embodiment of the microroughness measuring system of FIG. 3.

FIG. 6 is a more detailed block diagram of the transmissive type measuring system 40, in accordance with the invention. The reflective type measuring system, will be described below with reference to FIG. 7. For each of these systems, the various optical components are selected to match the wavelength of the generated beams. With reference to FIG. 6, the transmissive type measuring system may include the generator 42, the detector 48, a focusing system 120, a substrate aligning system 122, a substrate positioning system 124, and a recombining system 126. Each of these systems within the transmissive type measuring system will be described below in more detail.

The generator 42 generates the first beam and the second beam, and may include a laser 130, that may be a diode-pumped yttrium aluminum garnet (YAG) laser that may emit a beam 134 of coherent light. The beam 134 may have a power of less than 100 mW, and may preferably be 25 mW. The beam may have a wavelength of greater than 1100 nanometers, and may preferably be about 1300 nanometers for a silicon substrate. For this transmissive system, the optical components of the system are chosen to match the wavelength of the beams.

The generator also may include an isolator and beam expander 132 to prevent light from being reflected back into the laser which improves beam stability, and to increase the size of the beam so that it fills the aperture of an objective in the focusing system 120. The generator also may include a quarter waveplate 136 that circularly polarizes the beam 134 so that it has two components with polarizations that are 90° different.

At this point, the beam 134 has two components having a first polarization component (the first beam), and a second polarization component (the second beam). Then, as described below, the first beam and second beam are split apart in the focusing system and two substantially parallel separate beams are formed. The different polarizations of the first beam and the second beam permit the two beams to be recombined, as described below, without interfering them with each other.

The focusing system 120 splits the beam 134 from the generator 42 into the first beam and the second beam, and then focuses the beams onto the substrate. The focusing system may include a lens 140 that matches the back focal length of an objective 144. The focusing system may also include a Wollaston prism 142, that splits the beam 134 from the generator 42, and creates a first beam and a second beam that are slightly divergent and have orthogonal polarizations. The divergence angle of the analyzer beam and the reference beam determines the amount of separation of the beams as they pass through the substrate. The separation of the analyzer beam and the reference beam may be selected depending on the measurement being made, but is preferably one micrometer. The prism 142 may be a Nomarski phase plate. An objective 144 focuses the first beam and the second beam onto the substrate surface. The objective may be a 100 X microscope objective with a high numerical aperture, on the order of 0.85, to provide a small focal spot on the order of 1.9 $\mu$m in diameter.

The substrate may be moved to generate a microroughness value for a region of the substrate by the substrate positioning system 124, that may include a stage 150 that supports the substrate, and a piezoelectric element 152 that moves the substrate in small discrete increments. The substrate may be moved about 1 $\mu$m in range at a velocity of 2 $\mu$m/sec. The lens 140 may also be moved instead of the substrate. The movement of the substrate or the measuring system causes the beams to scan across a region of the substrate. To align the substrate surface with the measuring system, the aligning system 122 is used which may include a beam splitter 158, a lens 160, an autofocus pinhole 162, a lens 164 and a photodetector 166. The beam splitter diverts a small amount of light reflected back from the substrate surface through the autofocus pinhole and onto the photodetector. When the substrate is exactly at the focus of the objective 144, the spot at the back focus (i.e., the pinhole) will be a minimum diameter, and the signal from the photodetector 166 will be maximized. Thus, the substrate may be easily aligned with the measuring system.

Once the first beam and second beam pass through the substrate, they enter the recombining system 126. The recombining system may include an objective 172 that is identical to the objective 144 of the focussing prism, a Wollaston prism 170, and a lens 174. The Wollaston prism, that may be a Nomarski phase plate, is matched to the other Wollaston prism in the focusing system, and recombines the first beam and the second beam back together into a single beam with two differently polarized components, but does not interfere the beams with each other since they have different polarizations. The lens 174 recollimates the recombined beam.

The recombined first and second beams enter the detector 48, which may include a polarizing beam splitter 180, a first photodetector 182 and a second photodetector 184. The polarizing beam splitter is mounted at a 45° angle to the two orthogonal polarizations of the first beam and the second beam, mixes the two orthogonally polarized components of the beam, and provides a sum of the electric fields of the orthogonally polarized components to the first photodetector 182, and a difference of the electric fields of the orthogonally polarized components to the second photodetector 184. The two signals from these two photodetectors may then be subtracted from each other, by a difference amplifier that is not shown, in order to provide a signal that is a function of the number of microroughness particles on the surface, as described below.

To reset and zero either the transmissive or reflective type microroughness measuring system, a substrate is positioned in the measuring system. To zero the system, which may be done by measuring the noise within the system, the substrate is fixed in a position so that the output of the measuring system is a measure of the noise within the system. Once the noise has been determined, then either system may be calibrated so that the system noise is canceled, and the system is zeroed.

Figure 7:
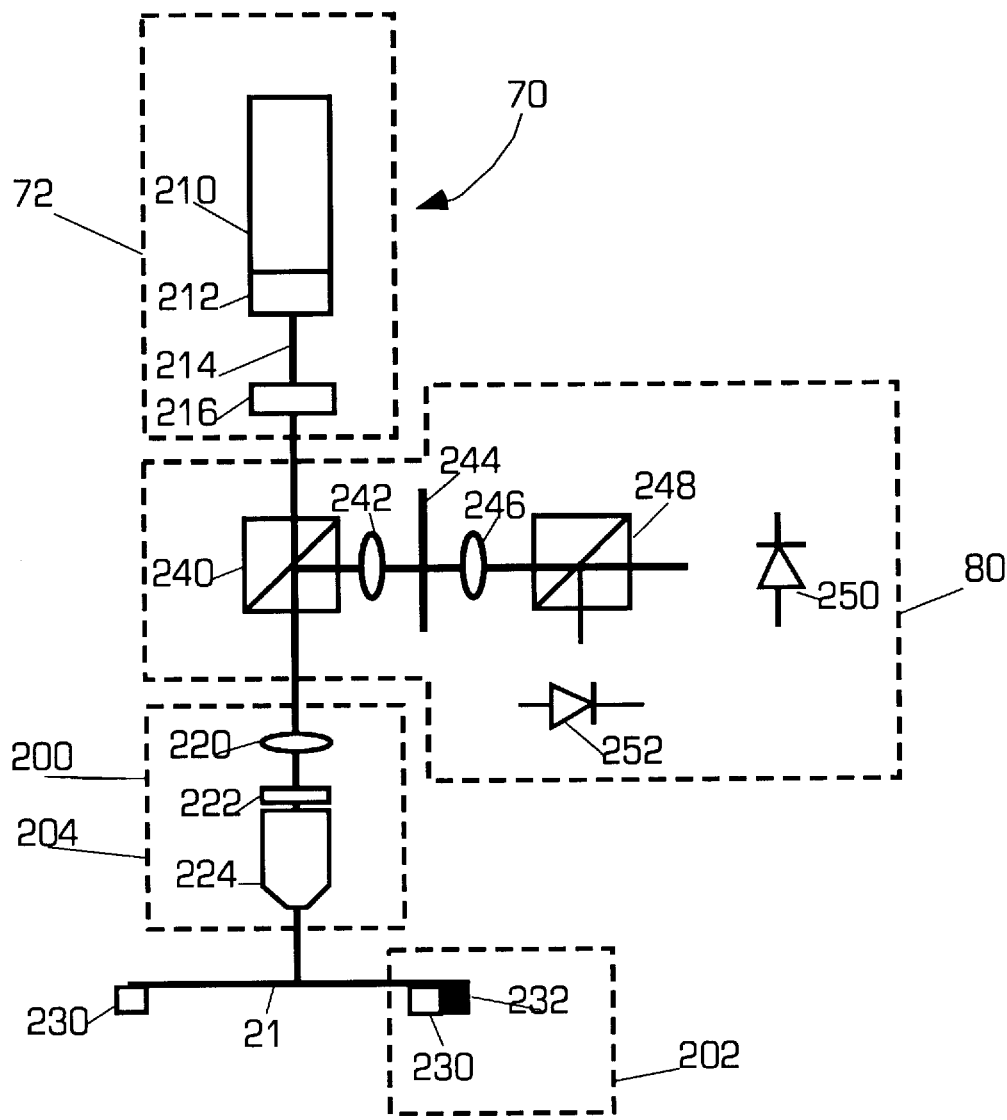
FIG. 7 is more detailed block diagram of the reflective type second embodiment of the microroughness measuring system of FIG. 4.

FIG. 7 is a more detailed block diagram of the reflective type measuring system in accordance with the invention. As with the transmissive type measuring system, shown in FIG. 6, the reflective measuring system has many similar components that will not be described in detail here because they are described above. The reflective system 70 may include the generator 72, the detector 80, a focusing system 200, an aligning system (not shown), a substrate positioning system 202, and a recombining system 204. In this reflective type system, however, the recombining system 204 and the focusing system 200 use the same physical components which reduces the cost of the overall system.

The generator 72 may include a light beam generator 210 that may be a diode pumped YAG laser that generates a beam 214 of electromagnetic energy at a wavelength of less than 1100 nm, and preferably of 530 nm. The generator may also include an isolator and beam expander 212, and a quarter waveplate 216, as described above. The beam has the same optical characteristics (i.e., circular polarization and spacing) as the beam in the transmissive system.

The beam 214 enters the focusing system 200 that separates the beam 214 into a first beam with a first polarization, and a second beam with a second polarization, and focuses the beams onto the substrate. The focusing system may also include a lens 220 for focusing the beam, as described above, a Wollaston prism 222 for separating the first beam and the second beam, as described above, and an objective 224 for focusing the beam onto the substrate, as described above.

The aligning system, shown as part of the detector, is similar to the aligning system of the transmissive system and will not be described here. The aligning system may include a lens 242, a pinhole 244, and a second lens 246. The substrate positioning system 202 may include a stage 230 and a piezoelectric element 232 for moving the substrate independently in three axes to scan the beams across a region of the substrate, as described above.

The recombining system 204 of the reflective type measuring system 70 uses the same physical elements as the focusing system 200 and thus reduces the cost of the reflective type measuring system. The recombining system operates in the same manner as the transmissive recombining system and will not be described here.

Finally, the detector 80 may include a beam splitter 240 for directing energy towards the detector, a polarizing beam splitter 248 for generating a sum and difference of the electric fields of each beam signal, as described above, a first photodetector 250, and a second photodetector 252. The photodetectors 250, 252, as described above, generate a sum and difference signal, respectively. As above, the sum and difference signals may be subtracted from each other to determine the density of microroughness at a particular size. The reflective measuring system operates in the same manner as the transmissive type system, described with reference to FIG. 6, and the operation of the reflective system will not be described here.

To facilitate a better understanding of the invention, the theoretical background and mathematical basis for the invention will now be explained. The microroughness of a surface of a substrate must be modeled in some fashion in order to describe the microroughness measuring system. For example, the microroughness may be modeled to be a plurality of very small silicon particles, that have a diameter on the order of the size of the roughness. Thus, electromagnetic radiation that strikes the very small silicon particles will scatter due to each of the particles, and the power scattered by each particle, $P_{st}$, known as Rayleigh scattering, is described in terms of the size of the scattering particle, the laser power, and the beam radius, and may be expressed as the following equation:

$$P_{st} = \left( \frac{8\pi}{3} \right) k^4 \alpha^2 \left( \frac{P_l}{\pi w_o^2} \right) \quad (1)$$

where k is the wavenumber of the beam ($k=2\pi/\lambda$) $\lambda$ is the wavelength of the first and second beam, $P_l$ is the power of the incoming first or second beam of electromagnetic radiation, $w_o$ is the radius of the first or second beam at the focus, as described below, and $\alpha$ is the polarizability, as described below. The Raleigh scattering measures the power that is scattered by a particular particle under a particular beam.

The polarizability, $\alpha$, is a measure of how much scattering occurs for a particle having a particular size and index of refraction and may be given by the following equation $$\alpha = \left( \frac{m-1}{m+2} \right) \left( \frac{d_s}{2} \right)^3 \quad (2)$$

where m is the index of refraction of the surface of the substrate relative to the air, and $d_s$ is the diameter of the scattering particle. The index of refraction for a silicon substrate, for example, is 3.6. The beam radius at the focus is a function of the parameters of the electromagnetic radiation, as well as the numerical aperture of the objective used to focus the beam and may be given by:

$$w_o = \frac{\lambda f}{\pi w_l} = \frac{\lambda}{\pi NA} \quad (3)$$

where f is the focal length of the objective lens, $w_l$ is the radius of the objective lens and NA is the numerical aperture of the objective lens, which is given by $NA=w_l/f$.

From these three equations, it can be seen that the power that is scattered by a particle is related to the size of the particle. The Rayleigh scattering power is actually the total power scattered in all directions by the particle. The power actually scattered into the detector, in both the transmissive and reflective system, is approximately equal to the ratio of the solid angle subtended by the detector to the solid angle of a full sphere. This approximation is low by a factor of ⅔ because the scattering of the beam is symmetric about the optic axis, but proportional to the cosine of the angle with respect to the optic axis. The scattering of electromagnetic radiation back to the detector in the reflective type microroughness measuring system, known as backscatter, at an angle of 180° (cos 180=-1) , is independent of angle. Simlarly, for the scattering of electromagnetic radiation in the direction of the beams (angle=360°), for the transmissive system, the scattering is also independent of the angle since cos (360°)=1. The fraction of the scattered power that is scattered either forward or backward into the detector is given by:

$$\text{fraction} = \frac{2\pi (R \sin\theta)^2}{4\pi R^2} \approx \frac{NA^2}{2} \quad (4)$$

where R is the radius of the sphere of scattered electromagnetic radiation, and $\theta$ is the angle subtended by the detector.

If equations (1), (3) and (4) are combined together, the power scattered into the detector, $P_s$ is given by $$P_s = \frac{(k^3 \alpha NA^2)^2}{3} P_l \quad (5)$$

The scattered electric field is the square root of the quantity in Equation (5). Thus, power scattered to the detector for each scattering particle may be determined. Since there are two detectors that are receiving power from two beams, the first beam and the second beam, the powers of each beam must be added together. In fact, the power at each detector is equal to the squared magnitude of the electric field of each beam are given by the following equations:

$$P_s = |E_s + E_p|^2 \quad (6)$$

$$P_s = |E_s - E_p|^2 \quad (7)$$

where $E_s$ and $E_p$ are the electric fields of the first and second beam, respectively.

The electric field of the first beam with a first polarization is a function of the main beam generated by the generator and the scattered field from the surface of the substrate, and is given by $$E_s = E_{so} + e^{j\frac{\pi}{2}} \sum_m E_{sm} \tag{8}$$

where $E_{so}$ is the electric field of the main beam, and sm is the electric field from each individual scatterer. The scattered field is 90° out of phase with the field of the main beam because the main beam is phase shifted by 90° at the focus by virtue of the Gouy phase shift. Similarly, the electric field of the second beam with a second polarization, that may be 90° for circularly polarized beams, is given by:

$$E_p = E_{po}e^{j\delta} + \sum_n E_{pn} e^{j\left(\delta + \frac{\pi}{2}\right)} \tag{9}$$

where $E_{po}$ is the main beam electric field that has been phase shifted by δ due to the different polarizations of the second beam relative to the first beam, and pn is the electric field of each scatterer within the second beam. The phase shift δ will be π/2 for circularly polarized beams, as described above. Once again the main beam is phase shifted by 90° by the Gouy phase shift.

If these electric field equations (8) and (9) are substituted into equations (1) and (2), and assuming that the system is balanced so that $E_{so}=E_{po}=E_o$, and the difference between the detector signals is measured, the output power, $P_o$, of the difference between the detector powers is given by:

$$P_{oi} = 4E_o\sin(\delta) \left( \sum_n E_{pn} - \sum_m E_{sm} \right) \tag{10}$$

where $E_o$ is the electric field for the difference signal, $E_{pn}$ is the electric field of all of the scatters impinged by the second beam, and $E_{sm}$ is the electric field of all of the scatterers impinged by the first beam. This output power is for one spot on the substrate surface impinged by the first and second beam. The sums shown are taken over a large number of scattering particles so they are subject to statistical variations, and are non-zero. To measure the microroughness of an entire surface of the substrate, the first and second beams are scanned across the substrate, as described below.

Figure 8:
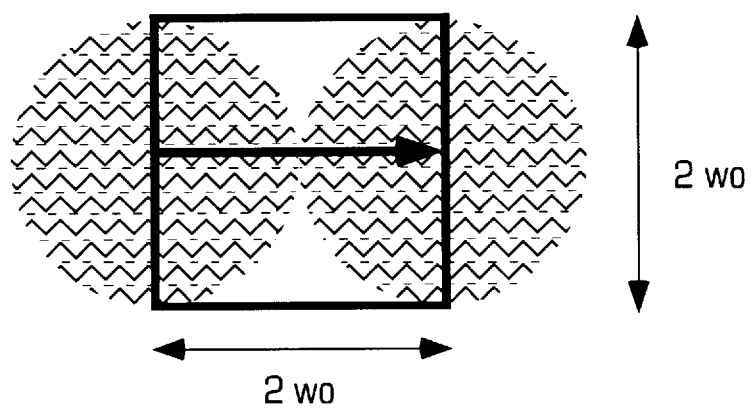
FIG. 8 is a diagram of the first beam being scanned across the surface of a substrate.

FIG. 8 shows a diagram of one of the beams before and after it has moved a distance equal to its diameter. The new area swept out by the beam is given by:

$$\text{Area} = \pi w_o^2 + 4w_o^2 - \pi w_o^2 = 4w_o^2 \tag{11}$$

where $w_o$ is the beam radius. The time that is takes the beam to move the distance is equal to $2w_o/v$, where v is the velocity of the substrate underneath the measuring system. If the mean area of a single scatterer on the surface of the substrate is $\pi(d_s)^2/4$, where $d_s$ is the diameter of the scatterer, then the fluctuation in the number of particular size scatterers as the beams move, $\sigma_i$, is given by $$\sigma_i = \frac{\sqrt{\text{number within spot}}}{\text{area of spot}} = \left(\frac{1}{\pi w_o^2}\right)\sqrt{\frac{4\pi w_o^2}{\pi d_i^2}} = \frac{2}{w_o d_i} \tag{12}$$

If the fluctuation in the number of scatterers is substituted back into equations (10) and (5), then the total power, $P_{oi}$, of all of the scatterers for both beams is equal to:

$$P_{oi} = 2\sqrt{\frac{2}{3}} \pi w_o^2 \sigma_i k^3 \alpha \, (NA)^2 P_l \tag{13}$$

Figure 9:
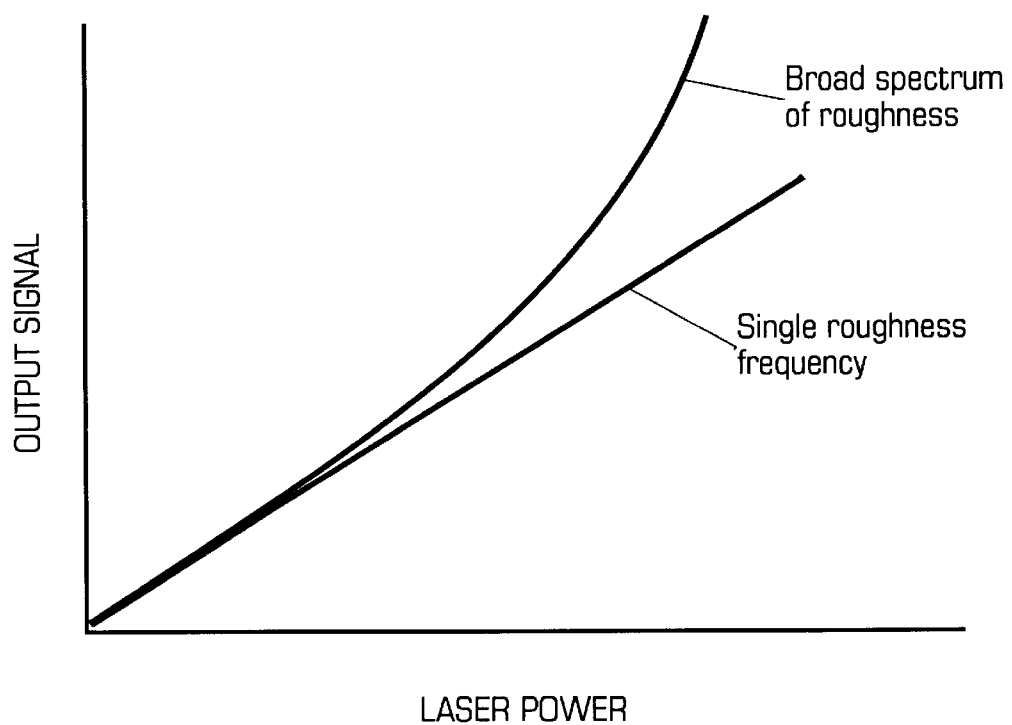
FIG. 9 is a chart showing the relationship between the output signal and the beam power level.

Thus, if the input power and spot size of the generated beams is known, then the output signal, $P_{oi}$, is a measure of the mean diameter of the roughness. To determine the density of microroughness for a plurality of microroughness sizes, the power of the beams, $P_l$, or the wavelength of the beams is varied. As these variables are increased, the microroughness measuring system will be sensitive to smaller and smaller diameters of microroughness. If the increase in power did not detect smaller microroughness particles, then the output signal would be linear over different power levels. However, in this system, the output signal is not linear since more microroughness becomes detectable as the power, frequency, or wavelength of the generated beams is increased. As shown in FIG. 9, for a substrate surface with only a single size of microroughness, the output signal is linear with the power of the generated beams. However, for substrate surfaces that have a plurality of sizes of microroughness, which is the usual situation, the output signal is not linear with respect to the generated beams power. Thus, the number of scatterers for each size of microroughness may be determined.

Figure 10:
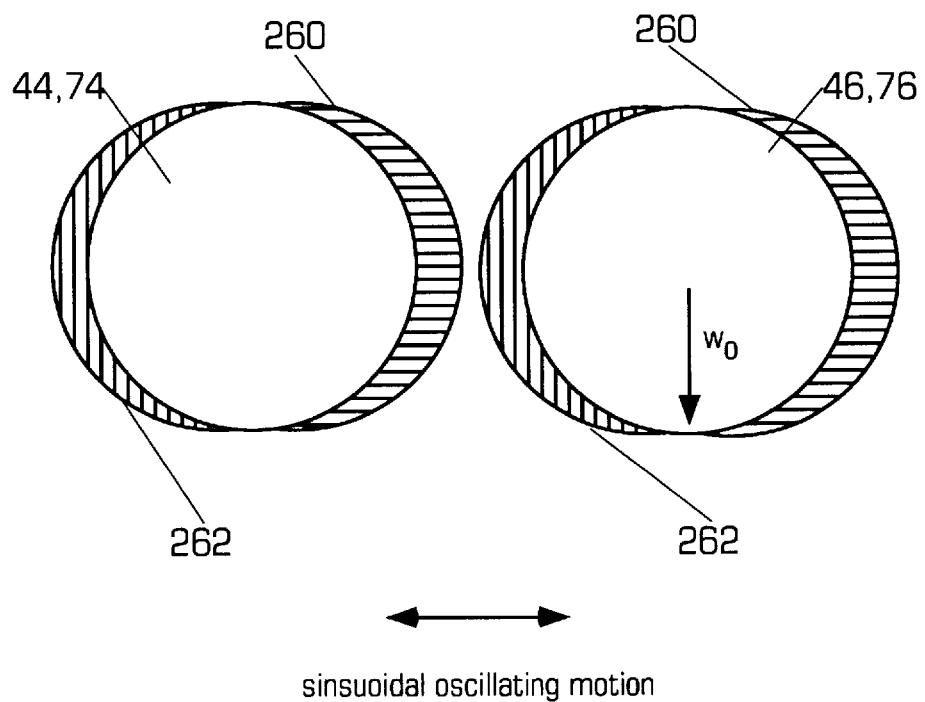
FIG. 10 is a diagram of the first and second beams scanning across a substrate.

To understand how the output signal may preferably be used to determine the microroughness of the substrate as a function either of the size of the microroughness or of the density of the microroughness, FIG. 10 shows the first beam 44, 74 and the second beam 46, 76 of the microroughness measuring system scanning across the surface of the substrate. Both beams, for purposes of this analysis, are assumed to have a radius of $w_0$, and are assumed to be moving in an oscillatory motion, where the velocity of the oscillations is given by:

$$v = v_0 \sin(\omega t) \tag{14}$$

As shown in FIG. 10, as the beams move in either direction, there are areas 260 in front of both beams, shown with horizontal cross-hatching, that are impinged by the scanning beams. At the same time, there are areas 262 behind both of the beams, shown with vertical cross-hatching, that are not longer impinged by the scanning beams. The rate at which area is being covered by both beams, dA/dt, is calculated using Equation (11) with the aid of FIG. 8, and is a function of the diameter of the beams and the velocity of the beams, and is given by:

$$\frac{dA}{dt} = 2w_o v(t) = 2w_o v_o \sin(\omega t) \tag{15}$$

The distribution of the roughness over an area of the surface of the substrate may be determined. To do this, the microroughness is modeled as a random array of defects, and the density of the defects (microroughness particles) of diameter d may be expressed as $$\rho(d) = \rho_0(d) \pm \sigma(d) \tag{16}$$

where $\rho_0(d)$ is the mean number of defects per unit area, and σ(d) is the standard deviation. σ(d) is proportional to the square root of $\rho_0(d)$, as in Equation 12, and expresses the statistical fluctuation of the defect density.

The instantaneous fluctuations (variation) in the output signal from each of the individual shaded regions is given by the product of the rate of exposure of the defects, and the signal obtained per unit area from defects of size $d_i$, and is given by the following equation $$\frac{d_i(P_{segment}(d_i))}{dt} = \frac{(2w_o v_o \sin(\omega t)) \times (P_l \Delta\phi(d_i))}{\pi w_o^2} \tag{17}$$

The phase shift, Δφ, is found by recognizing that the scatter from the defects is in quadrature to the main beams. This is because the scatter comes from the focus, and a beam undergoes a 90° phase shift between the focus and the far field, as described by the Gouy phase shift. Thus, the scattered power is given by the following equation:

$$P_{sc} = P_l e^{j\Delta\phi} \sim P_l(1 + j\Delta\phi) \qquad (18)$$

Comparing Equation 18 with Equation 13 permits the determination of the phase shift for an aggregate of scatters under the beams, $\Delta\phi$, that is given by:

$$\Delta\phi = 2\sqrt{\frac{2}{3}} \; \pi w_o^2 \sigma_i k^3 \alpha \, (NA)^2 \qquad (19)$$

The contributions of the individual segments are uncorrelated, and therefore add quadratically (i.e., the square root of the sum of the squares). The four segments, two beams each with a leading and trailing edge, shown in FIG. 10, are assumed to have equal microroughness distributions, so that the quadratic sum is just two times equation (19), providing an instantaneous rate of generating signal power as a function of defect diameter that is given by $$\frac{d(P_S(d))}{dt} = \frac{4\sigma(d)P_l\Delta\phi(d)w_0 v_0 \sin(\omega t)}{\pi w_o^2} \qquad (20)$$

The average power of the output signal over a single sweep (i.e., half of a cycle of the sine wave), is given by:

$$\overline{P}_s(d) = \frac{1}{\omega} \int_0^\pi \frac{d(P_s(d))}{dt} \, d(\omega t) = \frac{4P_l\Delta\phi(d)v_0}{\pi^2 \omega_o f_s} \qquad (21)$$

where $\omega = 2\pi f_s$, and $f_s$ is the frequency of the scan.

The signal has a sinusoidal variation that is in phase with the oscillatory motion of the beams that is given by the following equation:

$$P_s(d, t) = \overline{P}_s(d)\sin(\omega t) = \frac{4P_l\Delta\phi(d)v_0}{\pi^2 \omega_o f_s} \sin(\omega t) \qquad (22)$$

The signal may be detected by locking in on the frequency of the scan. The measurement provides an output that is a product of the statistical fluctuation, and the phase shift, the former being proportional to the square root of the density of the microroughness, as described above, and the latter being proportional to the size of the defects (i.e., microroughness particles). It is difficult to separate these two components, although the statistical fluctuation varies weakly, as the square root of the diameter of the microroughness, while the phase shift varies strongly as the sixth power of the diameter. Therefore, sweeping the power or frequency of the beams provides a good characterization of the microroughness of the surface as a function of size.

Thus, if the input power and spot size and known, the output signal is a measure of the mean diameter of the roughness. The roughness spectrum may be determined by sweeping the power of the beams. As the power of the beams is increased, the system will become more sensitive to smaller and smaller levels of roughness. Thus, the output will not increase linearly with power, which would be the case if there was only one frequency of roughness variation. Instead, the output increases superlinearly, as shown in FIG. 9, as finer roughness becomes detectable.

The scan velocity must be very slow in order to capture the noise fluctuations within the bandwidth of the detector. If the scan is too fast, the higher frequency fluctuations will be filtered out, and signals due to higher densities of microroughness, corresponding to smaller scale roughness, will not be seen.

The criterion relating the scan velocity to the bandwidth, BW, is, from Equations (12) and (15):

$$BW = \frac{dN}{dt} = \sigma \frac{dA}{dt} = \frac{4v_o}{d_i} \qquad (23)$$

For a bandwidth of 40 KHz and a mean undulation diameter of 0.1 nm, the scan velocity is 1 $\mu$m/sec. This provides an alternative way to obtain a size spectrum. As the scan velocity is increased, the sensitivity to smaller scale undulations will drop if the bandwidth is held constant.

Figure 11:
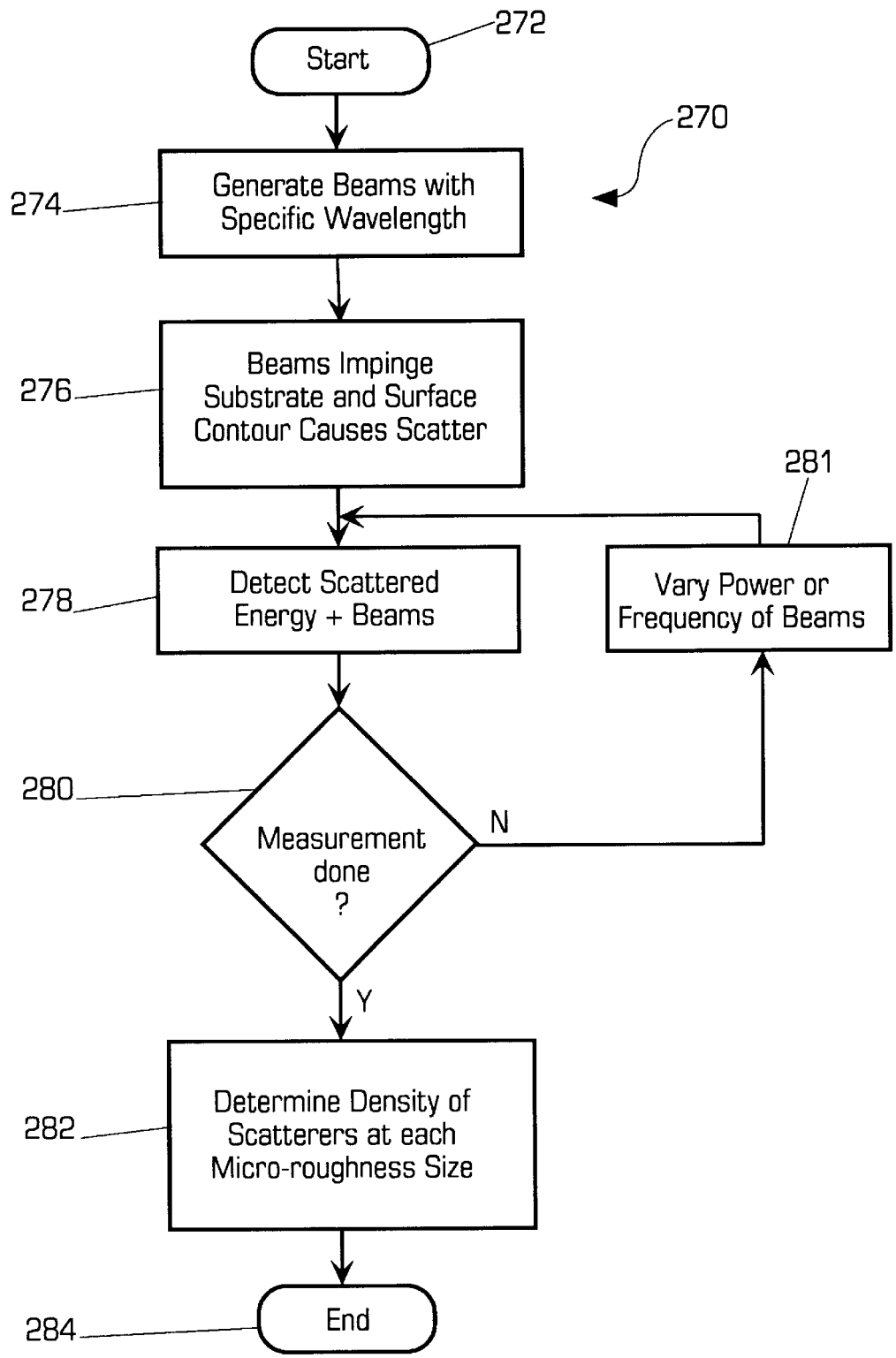
FIG. 11 is a flowchart depicting a method of measuring the microroughness of the surface of a substrate, in accordance with the invention.

FIG. 11 is flowchart showing a method 272 of measuring microroughness in accordance with the invention. The method starts at step 272, and in step 274, the first and second beams are generated at a wavelength, the wavelength depending on whether the transmissive measuring system or the reflective measuring system is being used. In step 276, the generated beams impinge on the surface of the substrate, and the contour of the surface which has a plurality of microroughness scatterers causes the beams to scatter in all directions. The scattered energy as well as the energy of the beams is then detected in step 278. Next, it is determined whether or not the measurement of the area has been completed (i.e., has the power level or frequency of the beams been varied to get a density value for various different microroughness sizes) in step 280. If the measurement is not complete, then in step 281, the power or the frequency of the generated beams is varied so that the number of different size scatterers may be measured, and control loops back to step 278 where the scattered and generated beam energy is detected. If the measurement is complete, then in step 282, the number of scatterers (density) for each microroughness size is determined, and the method is completed in step 284.

The noise within the measurement systems may be calculated. The largest noise component present within the system is shot noise, the noise created when a photon sometimes creates an electron in the conduction band of the photodetector. The shot noise power for each photodetector, $P_n$, is given by $$P_n = \sqrt{2q\left(\frac{P_l}{A}\right)(BW)} \qquad (24)$$

where BW is the bandwidth of the photodetectors q is the electron charge, $P_l$, is the energy of the light, and A is the conversion efficiency of the photodetectors. By combining equations (3) and (12), the signal to noise ratio (SNR) is found to be a function of the size of microroughness and the density of microroughness at a particular size, and is given by:

$$SNR = \frac{4v_o\Delta\phi}{\pi^2 \omega_o f_s} \sqrt{\frac{P_l A}{q(BW)}} \qquad (25)$$

Figure 12:
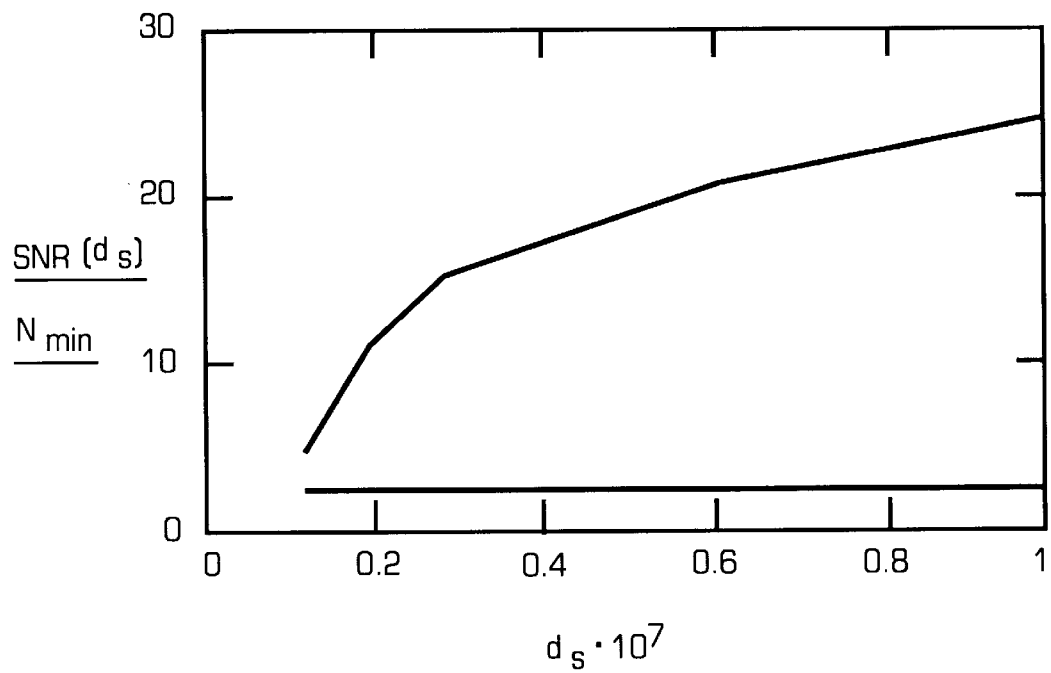
FIG. 12 is a chart showing the sensitivity of the microroughness measuring system in accordance with the invention.

As shown in FIG. 12, for a bandwidth of 5 Khz, a power of 10 mW, a conversion efficiency of 0.5 A/W, and a wavelength of 560 nm, the smallest detectable size of microroughness is 0.1 mn which is sufficient for future 0.1 $\mu$m fabrication processes. The minimum detectable phase shift is 0.5 $\mu$radians.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A system for measuring microroughness of a surface of a substrate, comprising:

means for generating a first beam of electromagnetic radiation and a second beam of electromagnetic radiation, the first and second beams being substantially parallel and spaced apart from each other so that the first and second beams are substantially non-overlapping;

means for focusing the first and second beams onto a surface of the substrate, the surface having a microroughness with a plurality of scattering points, each scattering point causing scattering of both beams and each scattering point being about one angstrom in size;

means for repetitively scanning the first and second beams across a selected area of the surface of the substrate;

means for detecting the scattering of the first and second beams during said scanning to generate an aggregate signal, said aggregate signal comprising the scattering signal from a plurality of scattering points impinged by each beam; and means, responsive to the detecting means, for determining the microroughness value of the selected area of the substrate based on the amount of scattering of the first and second beams.

2. The system of claim 1, wherein the size of the microroughness detected is proportional to the power of said beams, and further comprising means for varying the power of the beams generated by said generator in order to determine the microroughness values for different sizes of microroughness.

3. The system of claim 1, wherein the size of the microroughness detected is proportional to the frequency of said beams, and further comprising means for varying the frequency of the beams generated by said generator in order to determine the microroughness values for different sizes of microroughness.

4. The system of claim 1, further comprising means for scanning the first and second beams across a region of the substrate to generate a microroughness value for such region.

5. The system of claim 4, wherein the scanning means comprises means for supporting the substrate, and a piezoelectric element for moving the support means.

6. The system of claim 4, wherein the scanning means comprises means for moving an optical element of the measuring system, and means for detecting, in a synchronous manner, the signal generated by said first and second beams being scanned across the region of the substrate.

7. The system of claim 1, wherein the detecting means comprises means for producing a sum signal corresponding to a sum of the electric fields of the first and second beams, means for producing a difference signal corresponding to a difference of the electric fields of the first and second beams, and means for combining said difference signal from said sum signal to generate a signal corresponding to the microroughness value of the surface of the substrate.

8. The system of claim 2, wherein the determining means comprises means for producing a signal corresponding to a plurality of microroughness density values for a plurality of different microroughness sizes.

9. The system of claim 1, wherein the generation means comprises means for selecting a photon energy of the first and second beams so that the beams pass through the substrate.

10. The system of claim 9, wherein the selected photon energy is less than a band gap energy of the substrate.

11. The system of claim 1, wherein the generation means comprises means for selecting a photon energy of the first and second beams so that the beams reflect off of the substrate.

12. The system of claim 11, wherein the selected photon energy is greater than a band gap energy of the substrate.

13. The system of claim 1, wherein the generating means comprises means for generating a beam of electromagnetic radiation having two components with orthogonal polarizations, and means for separating the two components of orthogonal polarization into said first and second beams, and wherein the detecting means comprises means for recombining the separated first and second beams into a single beam with two components of orthogonal polarizations.

14. The system of claim 1, wherein the substrate is a semiconductor substrate.

15. The system of claim 1, wherein the substrate is a disk drive media substrate.

16. The system of claim 1, wherein the substrate is a flat panel liquid display substrate.

17. The system of claim 1, wherein the first and second beams are spaced apart from each other by about 1 micrometer.

18. A method for measuring microroughness of a surface of a substrate, comprising:

generating a first beam of electromagnetic radiation and a second beam of electromagnetic radiation, the first and second beams being substantially parallel and spaced apart from each other so that the first and second beams are substantially non-overlapping;

focusing the first and second beams onto a surface of the substrate, the surface having a microroughness with a plurality of scattering points, each scattering point causing scattering of both beams and each scattering point being about one angstrom in size;

repetitively scanning the first and second beams across a selected area of the surface of the substrate;

detecting the scattering of the first and second beams during said scanning to generate an aggregate signal, said aggregate signal comprising the scattering signal from a plurality of scattering points impinged by each beam; and determining the microroughness value of the selected area of the substrate based on the amount of scattering of the first and second beams.

19. The method of claim 18, wherein the size of the microroughness detected is proportional to the power of said beams, and further comprising varying the power of the beams generated by the generator in order to determine microroughness values for different sizes of microroughness.

20. The method of claim 18, wherein the size of the microroughness detected is proportional to the frequency of said beams, and further comprising varying the frequency of the beams generated by the generator in order to determine the microroughness values for different sized of microroughness.

21. The method of claim 18, further comprising scanning the first and second beams across a region of the substrate to generate a microroughness value for such region.

22. The method of claim 21, wherein scanning comprises moving an optical element of the measuring system, and detecting, in a synchronous manner, the signal generated by said first and second beams being scanned across the region of the substrate.

23. The method of claim 21, wherein determining comprises measuring areas of the substrate that are impinged by the beams as the substrate is being moved, determining a distribution of microroughness over said areas to produce a measurement signal, and measuring a phase shift of the measurement signal to produce said microroughness value of said substrate.

24. The method of claim 18, wherein detecting comprises producing a sum signal corresponding to a sum of the electric fields of the first and second beams, producing a difference signal corresponding to a difference of the electric fields of the first and second beams, and combining said difference signal from said sum signal to generate a signal corresponding to the microroughness value of the surface of the substrate.

25. The method of claim 24, wherein detecting comprises measuring a fraction of a Rayleigh scattering impinging on the detector.

26. The method of claim 19, wherein determining comprises producing a signal corresponding to a plurality of microroughness density values for a plurality of different microroughness sizes.

27. The method of claim 18, wherein generating the beams comprises selecting a photon energy of the first and second beams so that the beams pass through the substrate.

28. The method of claim 26, wherein the selected photon energy is less than a band gap energy of the substrate.

29. The method of claim 18, wherein generating the beams comprises selecting a photon energy of the first and second beams so that the beams reflect off of the substrate.

30. The method of claim 28, wherein the selected photon energy is greater than a band gap energy of the substrate.

31. The method of claim 18, wherein generating the beams comprises generating a beam of electromagnetic radiation having two components with orthogonal polarizations, and separating the two components of orthogonal polarization into said first and second beams, and wherein detecting the scattering comprises recombining the separated first and second beams into a single beam with two components of orthogonal polarizations.

32. The method of claim 18, wherein the substrate is a semiconductor substrate.

33. The method of claim 18, wherein the substrate is a disk drive media substrate.

34. The method of claim 18, wherein the substrate is a flat panel liquid display substrate.

35. A method for measuring microroughness on a surface of a semiconductor substrate during the fabrication process of a semiconductor device, the fabrication process including a plurality of process steps for forming various portions of the device, the method comprising:

generating a first beam of electromagnetic radiation and a second beam of electromagnetic radiation, the first and second beams being substantially parallel and spaced apart from each other so that the first and second beams are substantially non-overlapping;

focusing the first and second beams onto a surface of the substrate, the surface having a microroughness with a plurality of scattering points, each scattering point causing scattering of both beams and each scattering point is about one angstrom in size;

repetitively scanning the first and second beams across a selected area of the surface of the substrate;

detecting the scattering of the first and second beams during said scanning to generate an aggregate signal, said aggregate signal comprising the scattering signal from a plurality of scattering points impinged by each beam; and determining the microroughness value of the selected area of the substrate based on the amount of scattering of the first and second beams.

36. The method of claim 35, further comprising controlling one or more of the fabrication process steps in real-time based on the measured scattering to adjust the microroughness value of the surface of the substrate.

37. The method of claim 35, wherein generating the beams comprises selecting a photon energy of the first and second beams so that the beams pass through the substrate.

38. The method of claim 37, wherein the selected photon energy is less than a band gap energy of the substrate.

39. The method of claim 35, wherein generating the beams comprises selecting a photon energy of the first and second beams so that the beams reflect off of the substrate.

40. The method of claim 39, wherein the selected photon energy is greater than a band gap energy of the substrate.

* * * * *